(12) United States Patent
Pfaffmann et al.

(10) Patent No.: US 11,617,297 B2
(45) Date of Patent: Apr. 4, 2023

(54) AGRICULTURAL VEHICLE-TRAILER COMBINATION

(71) Applicant: DEERE & COMPANY, Moline, IL (US)

(72) Inventors: Simon Pfaffmann, Mannheim (DE); Volker Kegel, Mannheim (DE); Nicolai Tarasinski, Frankenthal (DE); Felipe De Moraes Boos, Kaiserslautern (DE)

(73) Assignee: DEERE & COMPANY, Moline, IL (US)

( * ) Notice: Subject to any disclaimer, the term of this patent is extended or adjusted under 35 U.S.C. 154(b) by 469 days.

(21) Appl. No.: 16/946,775

(22) Filed: Jul. 6, 2020

(65) Prior Publication Data

US 2021/0029864 A1 Feb. 4, 2021

(30) Foreign Application Priority Data

Aug. 1, 2019 (DE) .......................... 102019211496.2

(51) Int. Cl.
*A01B 59/041* (2006.01)
*A01B 59/043* (2006.01)
(Continued)

(52) U.S. Cl.
CPC .......... *A01B 73/044* (2013.01); *A01B 59/043* (2013.01); *A01B 21/04* (2013.01);
(Continued)

(58) Field of Classification Search
CPC ..... A01B 73/044; A01B 59/043; A01B 21/04; A01B 29/02; A01B 49/027; A01B 63/008; A01B 63/32
See application file for complete search history.

(56) References Cited

U.S. PATENT DOCUMENTS 2,777,373 A * 1/1957 Pursche .................. A01B 5/08
172/212
2,900,033 A * 8/1959 Coviello ................. A01B 5/14
172/221
(Continued)

FOREIGN PATENT DOCUMENTS

CN    200938740 Y    8/2007
DE  102018108024 A1  10/2019
(Continued)

OTHER PUBLICATIONS

European Search Report issued in counterpart application No. 20186889.0 dated Jan. 13, 2021 (05 pages).
(Continued)

*Primary Examiner* — Tara Mayo

(57) ABSTRACT

An agricultural vehicle-trailer combination includes a traction module including a drive element for engaging in a ground, a working appliance coupled to the traction module by a coupling apparatus, and a folding axle supporting the working appliance relative to the ground at least during a transport mode. A slewing mechanism of the coupling apparatus provides a degree of freedom of rotation between the traction module and the working appliance along a longitudinal axis of the working appliance. A pivot joint provides a degree of freedom of pivoting between the traction module and the working appliance along a vertical axis of the traction module. The pivot joint is adjustable relative to its pivot angle by a steering actuator for influencing the direction of travel of the vehicle-trailer combination.

20 Claims, 4 Drawing Sheets

(51) Int. Cl.
  *A01B 69/00*   (2006.01)
  *A01B 73/04*   (2006.01)
  *A01B 21/04*   (2006.01)
  *A01B 29/02*   (2006.01)
  *A01B 49/02*   (2006.01)
  *A01B 63/00*   (2006.01)
  *A01B 63/32*   (2006.01)

(52) U.S. Cl.
  CPC .............. *A01B 29/02* (2013.01); *A01B 49/027* (2013.01); *A01B 63/008* (2013.01); *A01B 63/32* (2013.01)

(56)    References Cited

U.S. PATENT DOCUMENTS

| | | | |
|---|---|---|---|
| 3,087,556 A * | 4/1963 | Pursche | A01B 3/464 |
| | | | 172/227 |
| 2017/0355252 A1 | 12/2017 | Jackson | |
| 2019/0103739 A1 | 4/2019 | Kegel et al. | |
| 2020/0298641 A1 | 9/2020 | Tarasinski et al. | |

FOREIGN PATENT DOCUMENTS

| | | |
|---|---|---|
| DE | 102019202826 | 9/2020 |
| EP | 3461676 A1 | 4/2019 |
| EP | 3702305 A1 | 9/2020 |
| EP | 3712003 A1 | 9/2020 |

OTHER PUBLICATIONS

Aebi Schmidt, EC 170 /130 Electrical implement carrier brochure, Mar. 2019.

\* cited by examiner

AGRICULTURAL VEHICLE-TRAILER COMBINATION

RELATED APPLICATIONS

This application claims priority to German Patent Application Ser. No. 102019211496.2, filed Aug. 1, 2019, the disclosure of which is hereby incorporated by reference in its entirety.

FIELD OF THE DISCLOSURE

The present disclosure relates to an agricultural vehicle-trailer combination having a traction module which is configured as an appliance carrier with a drive element engaging in the ground and a working appliance which is attached to the traction module by a coupling apparatus.

BACKGROUND

An agricultural vehicle-trailer combination with a fully electrical appliance carrier with a caterpillar drive is proposed, for example, by Aebi under the reference EC 170/130. Among other things, a portal cutter bar or a trailer may be attached to the appliance carrier. Due to its compact and maneuverable design, the appliance carrier is primarily suitable for specific tasks such as treating small meadow areas in mountainous terrain or steep slopes in viticulture.

In the present disclosure, it is desirable to develop an agricultural vehicle-trailer combination for universal use.

SUMMARY

In the present disclosure, an agricultural vehicle-trailer combination comprises a traction module which is configured as an appliance carrier with a drive element engaging in the ground and a working appliance which is attached to the traction module by a coupling apparatus, with a folding axle supporting the working appliance relative to the ground at least during transport mode. The coupling apparatus has a slewing mechanism for providing a degree of freedom of rotation between the traction module and the working appliance along a longitudinal axis of the working appliance and a pivot joint for providing a degree of freedom of pivoting between the traction module and the working appliance along a vertical axis of the traction module, wherein the pivot joint is adjustable relative to its pivot angle by a steering actuator for influencing the direction of travel of the vehicle-trailer combination.

The flexible attachment of the working appliance to the traction module which is provided by the coupling apparatus and the integration, which is provided in this respect, of articulated steering formed by the pivot joint leads to a particularly agile handling of the vehicle-trailer combination even in hilly terrain and when using relatively heavy or working appliances of large dimensions. This permits not only a universal use of the vehicle-trailer combination but at the same time preserves the advantages of established appliance carrier designs regarding flexibility and agility.

The coupling apparatus is typically located in the rear region of the traction module, so that the drive element undertakes the function of a driven front axle and the folding axle, at least during transport mode, undertakes the function of a rear axle of the vehicle-trailer combination in contact with the ground. During field mode, the folding axle is moved into a position remote from the ground so that the working appliance is supported via working tools provided for field treatment or associated guide wheels on the field surface to be treated. By way of example, a working appliance in the form of a harrow might be cited here, the working tools thereof which are configured as harrow discs or follower rollers being positioned on the field surface to be treated or engaging therein. In the case where the working appliance is equipped with driven working tools, it is conceivable to connect these working tools via a power take-off shaft, which is passed through the slewing mechanism of the coupling apparatus, to a power take off unit of the traction module. The working appliance may be, for example, a rotary swather, a row crop planter, or the like.

The agricultural vehicle-trailer combination may be a component of a vehicle fleet consisting of a plurality of individual vehicle-trailer combinations. In this case, there is the possibility that these vehicle-trailer combinations are operated in a driverless manner and thus have a corresponding autonomous vehicle controller.

The drive element engaging in the ground is an individual wheel drive or caterpillar drive. The use of a single-axle drive results in a particularly good maneuverability of the traction module and thus of the vehicle-trailer combination.

The drive element engaging in the ground may be electrically operated. The electrical energy is supplied, in particular, via a section of cable which may be connected to a power-source vehicle. One possible embodiment of such a section of cable for a vehicle fleet consisting of a plurality of individual vehicle-trailer combinations is disclosed, for example, in DE 10 2019 202 826 A1. Deviating therefrom, each of the vehicle-trailer combinations may also have a separate power source. To this end, the traction module is provided with a hydrogen-fed fuel cell or a rechargeable battery. Instead of an electrical drive it is also possible to provide a diesel-operated internal combustion engine of conventional design.

The steering actuator is formed, in particular, by at least one steering cylinder which, for adjusting the pivot angle, runs between a supporting structure of the traction module and a base plate of the pivot joint connected to the slewing mechanism. The activation of the steering cylinder may be carried out hydraulically, but an electrohydraulic or electromotive actuation may also be provided.

Additionally there is the possibility that the working appliance has a device for the height adjustment of the working tools provided for field treatment. The device for the height adjustment is formed, for example, by a parallelogram linkage system which may be actuated by a hydraulic cylinder and which permits a parallel adjustment of the working tools perpendicular to a field surface to be treated.

In addition, the working appliance may have a device for pivoting the folding axle from a lower position provided for transport mode into an upper position provided for field mode, in which at the same time working tools provided for field treatment may be brought into contact with the ground. For lifting out the working appliance or before commencing transport mode, the folding axle is pivoted back in the reverse direction. The device for pivoting the folding axle may comprise a hydraulic cylinder running between a load-bearing structure of the working appliance and a point of articulation of the folding axle.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
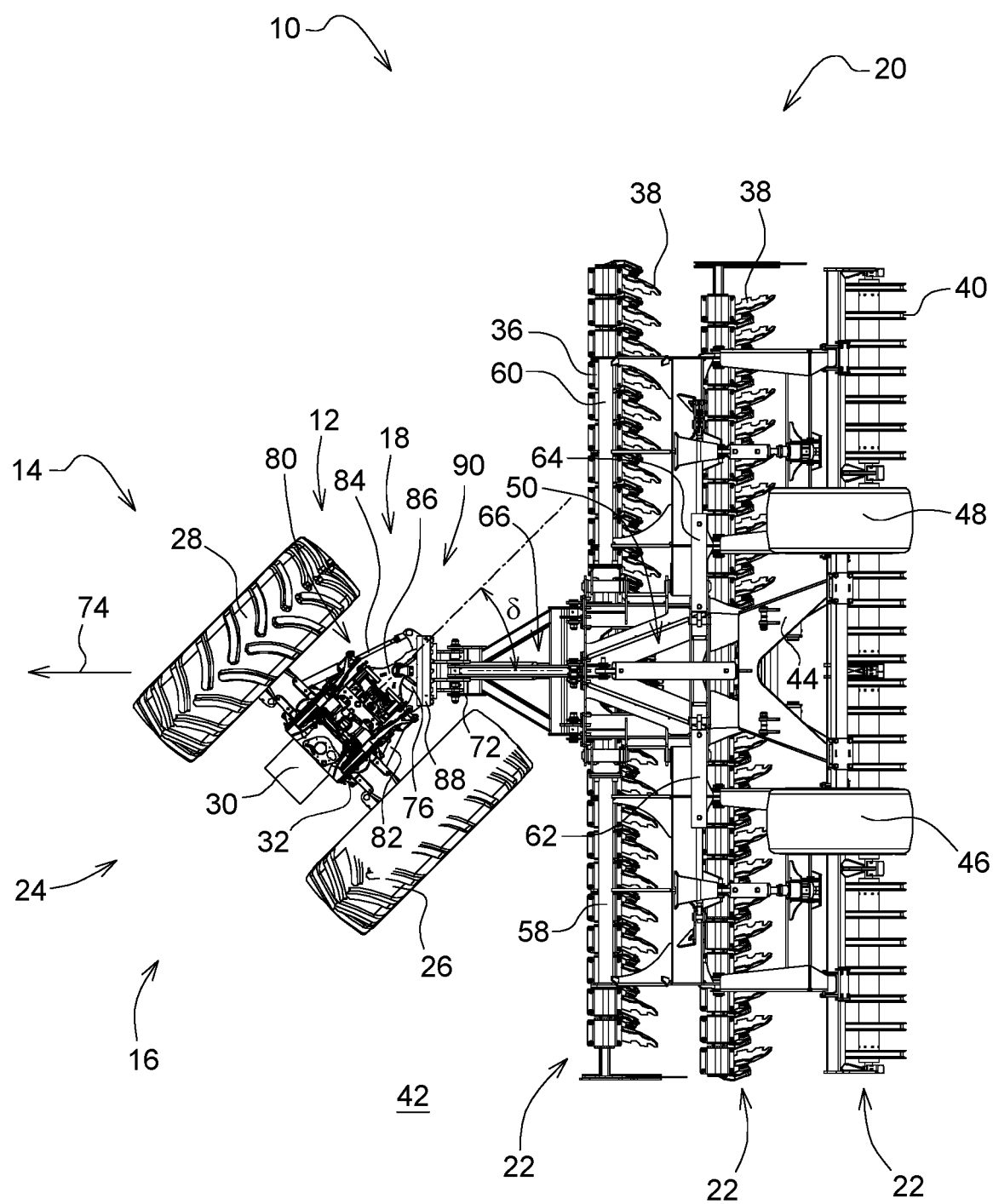
FIG. 1 shows an exemplary embodiment of an agricultural vehicle-trailer combination according to the present disclosure with a traction module configured as an appliance carrier as well as a working appliance attached thereto in a plan view.

FIG. 1 shows one embodiment of an agricultural vehicle-trailer combination according to the present disclosure which is described hereinafter with simultaneous reference to FIG. 2.

The vehicle-trailer combination 10 comprises a traction module 14 which is configured as an appliance carrier 12 with a drive element 16 engaging in the ground and a working appliance 20 with working tools 22 provided for field treatment which is attached to the traction module 14 by means of a coupling apparatus 18.

The working element 16 engaging in the ground is an individual wheel drive 24 with left-hand and right-hand drive wheels 26, 28 which are electrically operated by an electric motor 30 via an interconnected differential transmission 32. The electrical energy is supplied via a section of cable 34 which may be connected to a power-source vehicle. The section of cable 34, including the power-source vehicle, is not explicitly shown but further details may be derived from DE 10 2019 202 826 A1 in the case of a vehicle fleet consisting of a plurality of individual vehicle-trailer combinations 10. These vehicle-trailer combinations are operated in a driverless manner and have a corresponding autonomous vehicle controller.

Alternatively, the drive element 16 engaging in the ground may be configured as an individual caterpillar drive. In this case the caterpillar drive comprises on each of the two sides of the traction module 14 a rubber crawler track which is mounted by means of a plurality of clamping rollers, guide rollers and/or drive rollers.

By way of example, the working appliance 20 is a harrow 36 with working tools 22 configured as harrow discs 38 and/or follower rollers 40, which are positioned on a field surface 42 to be treated and/or engage therein.

Figure 3:
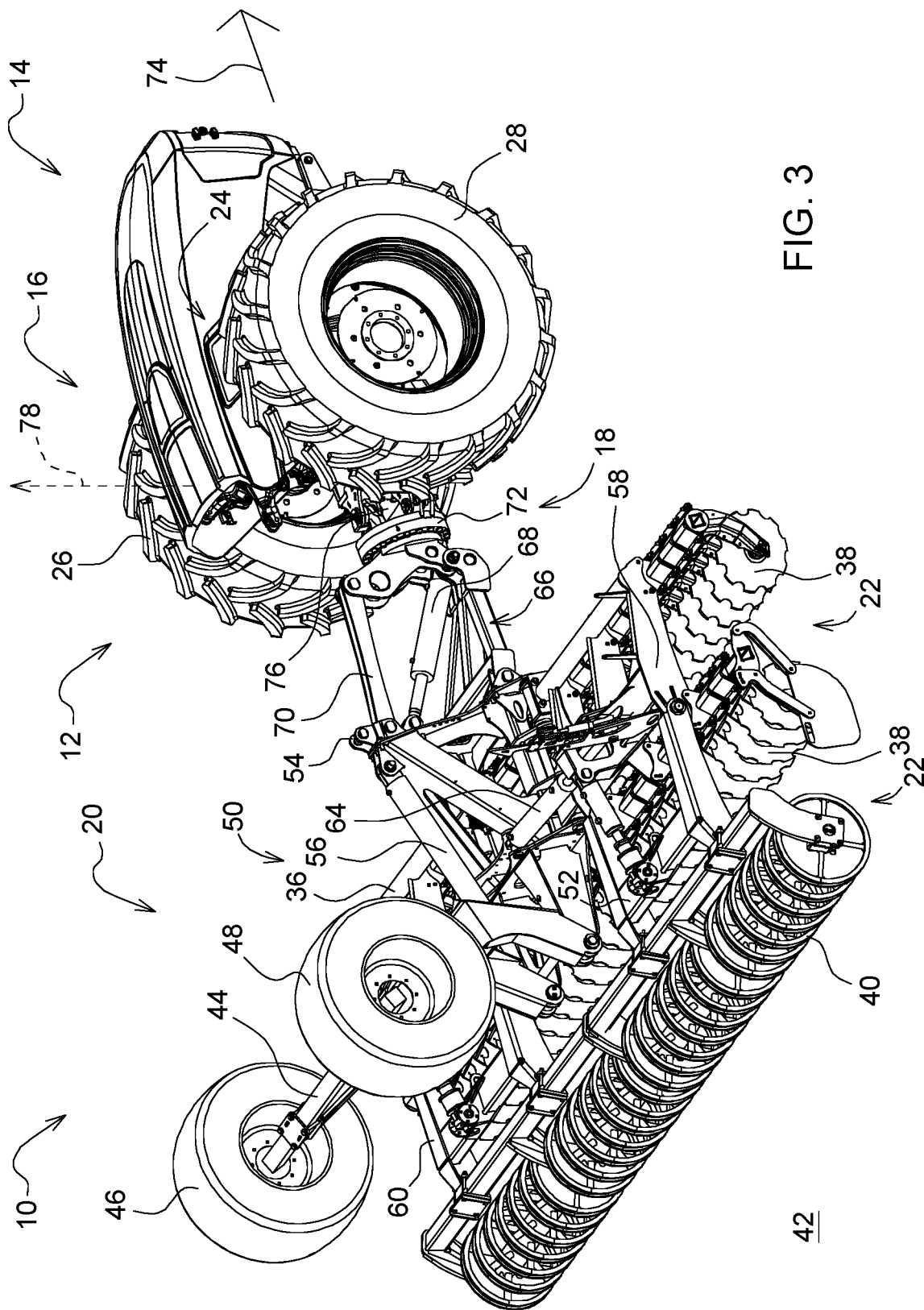
FIG. 3 shows a perspective view of the agricultural vehicle-trailer combination shown in FIG. 1 during transport mode.
Figure 4:
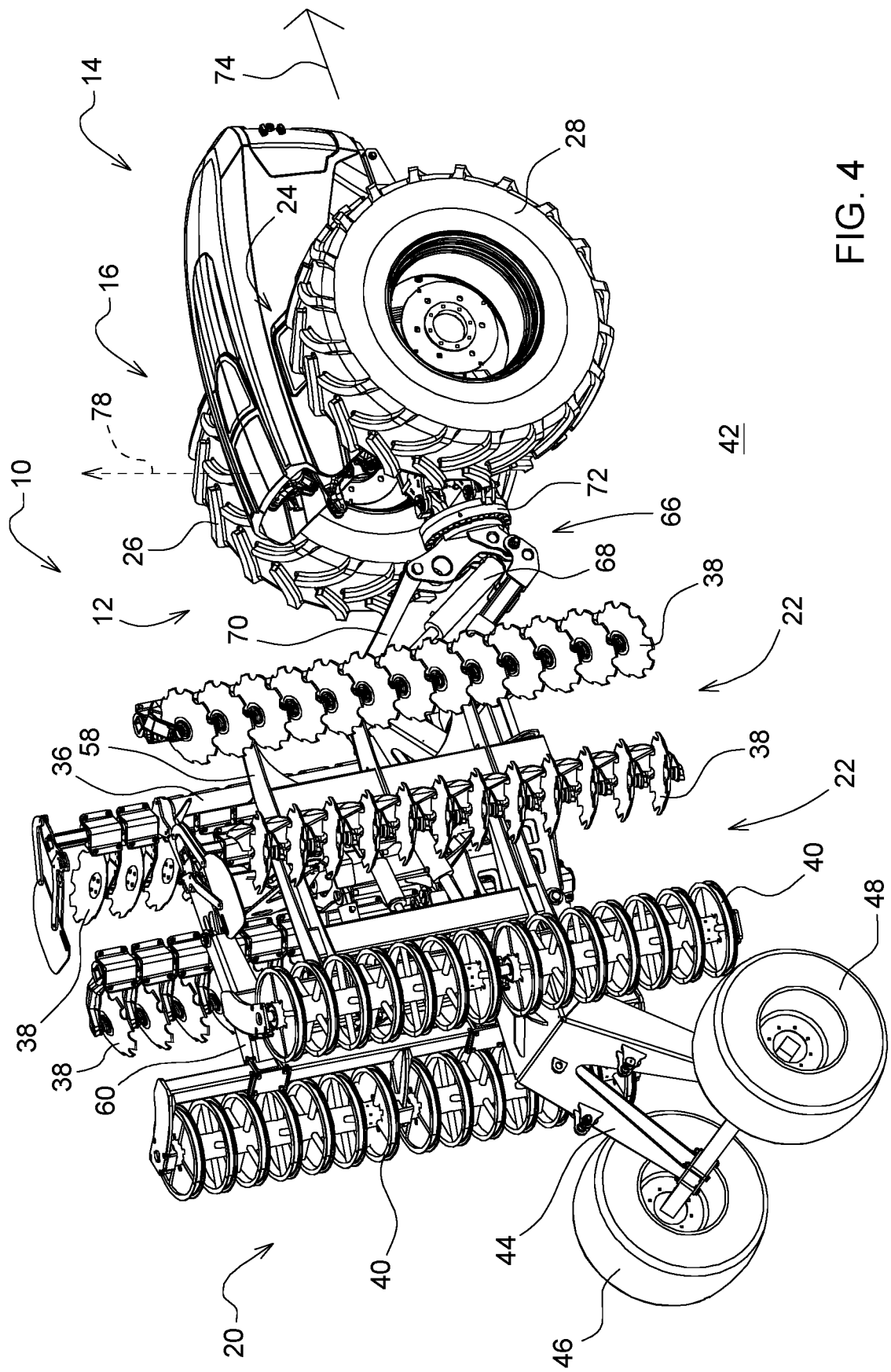
FIG. 4 shows a perspective view of the agricultural vehicle-trailer combination shown in FIG. 1 during field mode.

Located in the rear region of the working appliance 20 is a folding axle 44 with left-hand and right-hand wheels 46, 48. A device 50 for pivoting the folding axle 44 permits this folding axle to be pivoted from a lower position according to FIG. 3 provided for transport mode, in which the folding axle 44 supports the working appliance 20 relative to the ground, into an upper position according to FIG. 4 provided for field mode, in which at the same time the associated working tools 22 are brought into contact with the ground. For lifting out the working appliance 20 or before commencing the transport mode the folding axle 44 is pivoted back in the reverse direction. As may be derived from FIG. 2, the device 50 for pivoting the folding axle 44 comprises a hydraulic cylinder 56 running between a load-bearing structure 52 of the working appliance 20 and a point of articulation 54 of the folding axle 44.

By way of example, the working tools 22 are arranged so as to be distributed along left-hand and right-hand extension arms 58, 60 and may be moved by associated hydraulic cylinders 62, 64 into an upright position provided for transport mode according to FIG. 4.

Figure 2:
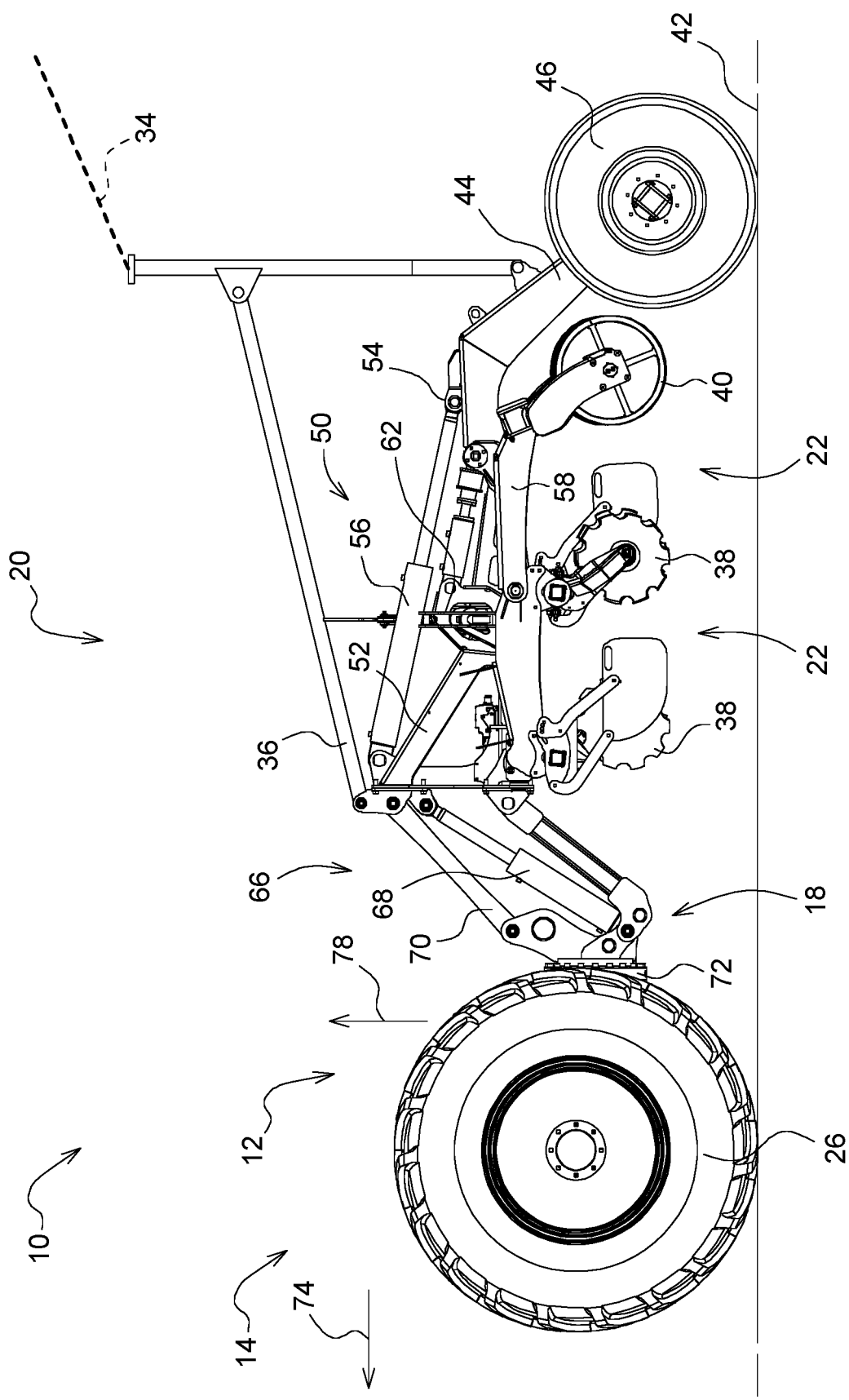
FIG. 2 shows a side view of the agricultural vehicle-trailer combination shown in FIG. 1.

Moreover, the working appliance 20 has a device 66 which may be identified in FIG. 2 for the height adjustment of the working tools 22. The device 66 for the height adjustment is formed by a parallelogram linkage system 70 which may be actuated by a further hydraulic cylinder 68, which permits a parallel adjustment of the working tools 22 perpendicular to the field surface 42 to be treated.

The coupling apparatus 18 which is provided between the traction module 14 and the working appliance 20 has a slewing mechanism 72 for providing a degree of freedom of rotation between the traction module 14 and the working appliance 20 along a longitudinal or roll axis 74 of the working appliance 20 and a pivot joint 76 for providing a degree of freedom of pivoting between the traction module 14 and the working appliance 20 along a vertical axis 78 of the traction module 14. The pivot joint 76 is adjustable relative to its pivot angle δ by a steering actuator 80 in order to influence the direction of travel of the vehicle-trailer combination 10. The steering actuator 80 is formed by left-hand and right-hand steering cylinders 82, 84 which for adjusting the pivot angle δ run between a supporting structure 86 of the traction module 14 and a base plate 88 of the pivot joint 76 connected to the slewing mechanism 72. The activation of the two steering cylinders 82, 84 is carried out hydraulically.

The coupling apparatus 18 is located in the present case in the rear region 90 of the traction module 14 so that the drive element 16 undertakes the function of a driven front axle and the folding axle 44, at least during transport mode, undertakes the function of a rear axle of the vehicle-trailer combination 10 in contact with the ground. In field mode, the folding axle 44 is moved into a position remote from the ground, so that the working appliance 20 is supported via its working tools 22 or associated guide wheels (not shown) on the field surface 42 to be treated.

In the event that the working appliance 20 is provided with driven working tools 22, these working tools may be connected via a power take-off shaft, which is passed through the slewing mechanism 72 of the coupling apparatus 18, to a power take off unit of the traction module 14. Thus, the working appliance 20 may be, for example, a rotary swather, a row crop planter, or the like.

The flexible attachment of the working appliance 20, which is provided by the coupling apparatus 18, to the traction module 14 and the integration provided in this regard of an articulated steering formed by the pivot joint 76 leads to particularly agile handling 10 of the vehicle-trailer combination 10 even in hilly terrain and when using relatively heavy or working appliances 20 of large dimensions.

While embodiments incorporating the principles of the present disclosure have been disclosed hereinabove, the present disclosure is not limited to the disclosed embodiments.

Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An agricultural vehicle-trailer combination comprising:
a traction module including a drive element for engaging in a ground;
a working appliance coupled to the traction module by a coupling apparatus;
a folding axle supporting the working appliance relative to the ground at least during a transport mode;
a slewing mechanism of the coupling apparatus for providing a degree of freedom of rotation between the traction module and the working appliance along a longitudinal axis of the working appliance; and
a pivot joint for providing a degree of freedom of pivoting between the traction module and the working appliance along a vertical axis of the traction module;
wherein, the pivot joint is adjustable relative to its pivot angle by a steering actuator for influencing the direction of travel of the vehicle-trailer combination.

2. The vehicle-trailer combination of claim 1, wherein the traction module comprises an appliance carrier.

3. The vehicle-trailer combination of claim 1, wherein the drive element engaging in the ground comprises an individual wheel drive.

4. The vehicle-trailer combination of claim 1, wherein the drive element engaging in the ground comprises a caterpillar drive.

5. The vehicle-trailer combination of claim 1, wherein the drive element is electrically operated.

6. The vehicle-trailer combination of claim 1, wherein the steering actuator is formed by at least one steering cylinder for adjusting the pivot angle and is disposed between a supporting structure of the traction module and a base plate of the pivot joint.

7. The vehicle-trailer combination of claim 6, wherein the base plate is connected to the slewing mechanism.

8. The vehicle-trailer combination of claim 1, wherein the working appliance comprises a device for adjusting a height of working tools provided for field treatment.

9. The vehicle-trailer combination of claim 1, wherein the working appliance comprises a device for pivoting the folding axle from a lower position provided for transport mode into an upper position provided for a field mode.

10. The vehicle-trailer combination of claim 9, wherein, as the folding axle is pivoted into the upper position, one or more working tools provided for field treatment are brought into contact with the ground.

11. A vehicle fleet, comprising:
a plurality of individual vehicle-trailer combinations, wherein each of the plurality of individual vehicle-trailer combinations comprises:
a traction module including a drive element for engaging in a ground;
a working appliance coupled to the traction module by a coupling apparatus;
a folding axle supporting the working appliance relative to the ground at least during a transport mode;
a slewing mechanism of the coupling apparatus for providing a degree of freedom of rotation between the traction module and the working appliance along a longitudinal axis of the working appliance; and
a pivot joint for providing a degree of freedom of pivoting between the traction module and the working appliance along a vertical axis of the traction module;
wherein, the pivot joint is adjustable relative to its pivot angle by a steering actuator for influencing the direction of travel of the vehicle-trailer combination.

12. The fleet of claim 11, wherein the drive element engaging in the ground comprises an individual wheel drive.

13. The fleet of claim 11, wherein the drive element engaging in the ground comprises a caterpillar drive.

14. The fleet of claim 11, wherein the drive element is electrically operated.

15. The fleet of claim 11, wherein the steering actuator is formed by at least one steering cylinder for adjusting the pivot angle and is disposed between a supporting structure of the traction module and a base plate of the pivot joint.

16. The fleet of claim 15, wherein the base plate is connected to the slewing mechanism.

17. The fleet of claim 11, wherein the working appliance comprises a device for adjusting a height of working tools provided for field treatment.

18. The fleet of claim 11, wherein the working appliance comprises a device for pivoting the folding axle from a lower position provided for transport mode into an upper position provided for a field mode.

19. The vehicle-trailer combination of claim 18, wherein, as the folding axle is pivoted into the upper position, one or more working tools provided for field treatment are brought into contact with the ground.

20. An agricultural vehicle-trailer combination comprising:
a traction module including a drive element for engaging in a ground;
a working appliance coupled to the traction module by a coupling apparatus;
a folding axle supporting the working appliance relative to the ground at least during a transport mode;
a slewing mechanism of the coupling apparatus for providing a degree of freedom of rotation between the traction module and the working appliance along a longitudinal axis of the working appliance; and
a pivot joint for providing a degree of freedom of pivoting between the traction module and the working appliance along a vertical axis of the traction module;
wherein, the pivot joint is adjustable relative to its pivot angle by a steering actuator for influencing the direction of travel of the vehicle-trailer combination;
wherein, the steering actuator is disposed between a supporting structure of the traction module and a base plate of the pivot joint
further wherein, the working appliance comprises a first device for adjusting a height of working tools provided for field treatment and a second device for pivoting the folding axle from a lower position provided for transport mode into an upper position provided for a field mode.

* * * * *